March 12, 1974  W. LABER ET AL  3,796,677
INCORPORATING RUBBER INTO THERMOPLASTICS
Filed July 26, 1971
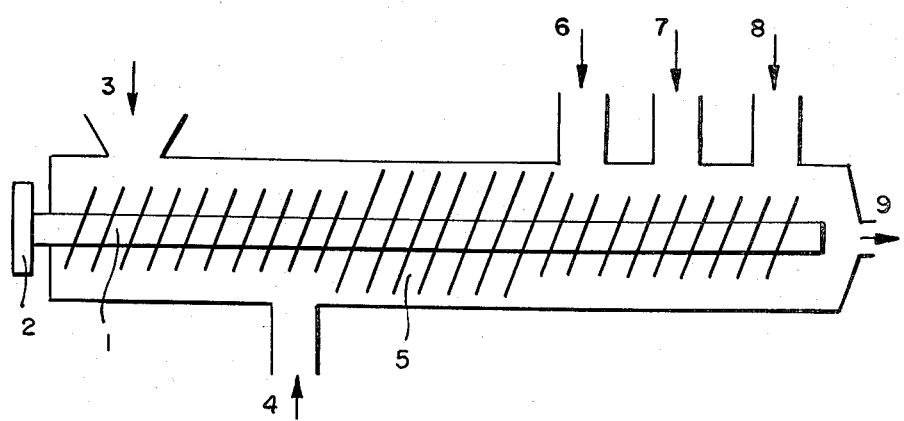
INVENTORS:
WALTER LABER
ALFRED GOTTSCHALK
JOSEF SCHWAAB
GUENTER JECKEL
HELMUT MOSTHAF
BY
Johnston, Root, O'Keeffe, Keil, Thompson & Shurtleff
ATT'YS

3,796,677
INCORPORATING RUBBER INTO THERMOPLASTICS

Walter Laber, Gimmeldingen, Alfred Gottschalk, Wachenheim, Josef Schwaab, Maikammer, Guenter Jeckel, Landau, and Helmut Mosthaf, Bad Durkheim, Germany, assignors to Badische Anilin- & Soda-Fabrik Aktiengesellschaft, Ludwigshafen (Rhine), Germany
Filed July 26, 1971, Ser. No. 166,081
Claims priority, application Germany, July 30, 1970, P 20 37 784.8
Int. Cl. C08c 9/14
U.S. Cl. 260—4                 12 Claims

ABSTRACT OF THE DISCLOSURE

A process for incorporating moist rubber into thermoplastics. Rubber latex is first coagulated, and the rubber is freed from the major portion of the water and then mixed with the molten thermoplastic. The resulting impact resistant modified thermoplastics are distinguished by high gloss and improved dimensional stability under heat.

---

The invention relates to a process for incorporating rubber into thermoplastics.

Thermoplastics are generally hard and brittle materials. An improvement in flexibility, toughness and impact strength is achieved by blending with elastomeric high polymers known as soft components.

Rubber is usually obtained in its manufacture in the form of aqueous dispersions. It is incorporated into thermoplastics and thus gives the desired impact resistant molding material. There are two methods available:

(a) Mixing the rubber dispersion with a dispersion of the thermoplastic, coprecipitation of the latices, drying an extrusion of the mixture. This method does yield a very homogenous mixture but it necessitates an elaborate and expensive drying process;

(b) Mixing dried rubber with a melt of the thermoplastic. Optimum distribution of the rubber particles in the thermoplastic is not possible with this method so that the impact-resistant plastic obtained does not satisfy requirements in all cases, particularly as regards surface characteristics. Rubbers having a high content of double bonds tend to ignite spontaneously in the drying process due to autoxidation. Moreover in the incorporation of dry rubber into a thermoplastic melt, local overheating may occur which results in thermal damage to the material. Marked crosslinking of the rubber may thus be caused which results in the formation of specks in the end product.

The invention has as an object the provision of a process for incorporating rubber into thermoplastics in a manner which is simple to carry out industrially and in which the said difficulties and disadvantages do not occur; in particular optimum mixing of the two components is to be achieved without damage occurring to the material during the mixing process, impact-resistant thermoplastics having improved properties being obtained.

These objects are achieved by a process for incorporating rubber into a thermplastic in which the rubber is precipitated, freed from the major portion of the water by mechanical means, and mixed with the thermoplastic at a temperature above the softening point of the thermoplastic, and the residual water is removed during or after the incorporation.

The process may be used in the production of impact-resistant thermoplastics, preferably of those based on styrene, vinyl chloride and methyl methacrylate. The following are examples of suitable thermoplastics: polystyrene; copolymers of styrene with acrylonitrile, methyl methacrylate, butadiene, maleic anhydride, α-methylstyrene, nuclear-alkylated and nuclear-chlorinated styrenes; polyvinyl chloride; copolymers of vinyl chloride with vinylidene chloride, propylene and vinyl esters; polymethyl methacrylate; polyformaldehyde; and copolymers of methyl methacrylate with acrylic esters.

The rubbers should have elastomeric properties so that they effect an improvement in the impact strength of the thermoplastics. Accordingly the term rubber means compounds having a glass temperature (according to K. H. Illers and H. Breuer, Kolloid-Zeitschrift, 176 (1961), p. 110) of less than 0° C., preferably of less than −30° C. The following are examples: natural rubber, synthetic rubbers such as polybutadiene, polyisoprene and copolymers of butadiene with styrene or acrylonitrile, and also elastomers based on polyacrylic esters, which may if desired be crosslinked, such as polyethyl acrylate, polybutyl acrylate, polyethylhexyl acrylate and copolymers of acrylic esters with butadiene, styrene, acrylonitrile and vinyl ethers.

It is preferred to use copolymers known as graft copolymers in which monomers forming rigid polymers are polymerized in aqueous emulsion onto a rubber base. It is known that the compatibility of the rubber with the thermoplastic is thus considerably improved. Suitable graft monomers are particularly styrene, acrylonitrile, methyl methacrylate and vinyl chloride, alone or mixed together. They may be grafted onto the rubber base in amounts of from 5 to 50% by weight. The ratio between thermoplastic and rubber depends on the desired softness and toughness of the finished plastic. It may vary within wide limits. The finished plastic advantageously contains from 5 to 60%, preferably from 10 to 50%, by weight of rubber.

The rubbers used are generally obtained in their manufacture in the form of aqueous dispersions, known as latices; such latices may have a solids content of from 10 to 70% by weight. They generally contain emulsifiers such as alkali metal salts of fatty acids, sulfonic acids and alcohol sulfates in amounts of up to 7% by weight.

These rubber latices are first coagulated so that rubber particles colloidally dispersed in water assemble together and flocculate. Precipitation may be effected by heating or by the use of high shearing forces, but in practice it is carried out by the addition of organic precipitants or electrolyte solutions, as for example a calcium chloride solution, or of acids. A substantial amount of the water, generally from 10 to 90%, preferably from 30 to 70%, by weight (with reference to the amount of water in the original rubber latex) is then separated mechanically. This may be done for example by filtration, pressing or centrifuging. The rubber which remains has the consistency of a moist solid; it is free-flowing and therefore can be metered conveniently. The rubber should have a water content of from 2 to 50%, preferably from 10 to 40%, and particularly advantageously from 20 to 35%, by weight. The water is adsorbed in the fairly voluminous rubber particles.

Incorporation of the rubber into the thermoplastic may be carried out in conventional mixing equipment, advantageously extruders or kneaders.

The thermoplastic is generally introduced into the mixing equipment as a melt. It is also possible however to start from a dispersion of the thermoplastic, to precipitate and partly dehydrate the same and then to work it in this form into the moist rubber by the process described above. Another possibility consists in mixing the dispersions of thermoplastic and rubber, carrying out coprecipitation, partly dehydrating, and introducing the free-flowing moist material obtained into a mixing and devolatilizing unit as described above.

When an extruder is used as the mixing means it is advantageous to meter in the moist rubber first. This may be carried out without heating or the use of superatmospheric pressure. The rubber is conveyed within the extruder and only then is the thermoplastic supplied in the form of a melt. This method has the advantage over the introduction of rubber into the melt of thermoplastic that the rubber can be introduced without superatmospheric pressure and thus under mild conditions.

After the thermoplastic and rubber have passed through together, the two components are mixed homogeneously together in a suitable mixing unit, for example by intensely mixing kneading members in the extruder. The temperature has to be above the softening point of the thermoplastic. In the case of styrene polymers, a suitable temperature range is from 180° to 300° C., preferably from 200° to 270° C. In the case of vinyl chloride polymers, lower temperatures, preferably of from 140° to 200° C., are used.

Conventional additives such as pigments, dyes, fillers and lubricants may be incorporated either in dry form by suitable equipment but advantageously in moist form together with the rubber.

Water contained in the rubber and possibly also in the thermoplastic has to be removed from the resultant melt during or after the incorporation step. This may be done by removing the water in liquid form using an adequately high counterpressure. It is more advantageous however to evaporate the water. For this purpose suitable devolatilizing means are used which are mounted downstream of the mixing zone in the extruder. It is important that solid should not be entrained with the steam through these openings. This may be ensured for example by providing suitable devolatilizing screws in the openings in the extruder so that entrained solid is returned to the main extruder. Devolatilization may be carried out with counter pressure, at atmospheric pressure or in vacuo. It is advantageous to provide a number of successive devolatilizing stages, the counter pressure decreasing in stages in the direction of conveyance in the main extruder. Constituents which are volatile in steam are removed together with the water. An additional purification of the thermoplastic and rubber from injurious impurities such as residual monomers, oligomers and emulsifiers, is thus made possible.

Energy is withdrawn from the melt by the evaporation of the water owing to its high heat of evaporation. For this reason it is possible, by varying the amount of water in the rubber, to set up a temperature profile along the length of the mixing means which ensures optimum mixing effects; the larger the amount of water which the moist material contains, the greater the energy which has to be applied for evaporation and the greater the heat withdrawn from the melt and the lower the temperature level of the melt.

It is not necessary to heat the mixing means because adequate energy can be supplied to the material being mixed by the shear action of the mixing members in order to keep the same at the desired level of temperature. It has been found that surprisingly no higher specific driving energy has to be introduced into the mixing unit for the incorporation of water-containing rubber into the thermoplastic than for the incorporation of dry rubber, although a substantial portion of the driving energy is utilized for evaporating water. Apparently the viscosity of the batch is decreased by the presence of the water to such an extent that considerably less mechanical energy is necessary for the mixing process than when using anhydrous conditions. Owing to the fairly low level of temperature on the one hand and the low shear forces for mixing on the other hand, the thermoplastic and rubber are subjected to considerably less thermal and mechanical stresses than is the case in the conventional incorporation of dry rubber. Moreover the temperature control in this process is much simpler and local overheating is thus avoided.

The process according to the invention therefore enables rubber to be incorporated into thermoplastics in a manner which is easy to carry out industrially. Thermal and mechanical stresses on the materials are fairly low. Homogeneous distribution of the components is achieved which is expressed in improved surface properties in the finished article, such as smoothness and gloss. Moreover injurious constituents of low molecular weight are removed from the mixture. This is evident in a slightly increased dimensional stability of the products under heat. The process has the further advantage that no additional melting process is required to incorporate additives and to granulate the impact resistant thermoplastic.

The following example illustrates the invention. Parts and percentages specified in the example are by weight.

EXAMPLE

A rubber latex is prepared by emulsion graft polymerization of 50 parts of a mixture of styrene and acrylonitrile in the ratio 70:30 in the presence of 100 parts of a copolymer of 40 parts of butadiene and 60 parts of butyl acrylate. The 40% emulsion is precipitated by adding a 1.5% solution of calcium chloride. The rubber is freed from water to such an extent by centrifuging that a moist powder remains with a water content of about 25%.

A styrene/acrylonitrile copolymer having an acrylonitrile content of 30% is prepared by solution polymerization, and is obtained in the form of a hot melt at a temperature of 230° C.

The mixing means used is a twin-screw extruder having a ratio of length to diameter of the screw of 36:1 which is shown diagrammatically in the drawing. The extruder is fitted with a double screw 1 which is driven by means 2. 265 parts of the moist rubber is fed uniformly at room temperature through feed hopper 3 each hour. 430 parts of a melt of a copolymer of styrene and acrylonitrile is metered in per hour through opening 4. Downstream of opening 4 there is a homogenizing zone 5 in the form of intensely mixing kneading members. The screw temperature is just below 250° C. About half of the water present in the mixture is removed at a pressure of about 0.3 atmosphere gauge through a port 6. The major proportion of the remaining water is evaporated at atmospheric pressure through a port 7 and the remainder is devolatilized through port 8 at ap ressure of about 100 mm. All three ports are provided with screws which prevent entrainment of solids with the steam. The end product leaves at orifice 9 at a temperature of 250° C. and is granulated by a suitable granulator.

The product obtained may be processed into moldings which exhibit very good mechanical properties, high gloss, a smooth surface and high dimensional stability under heat.

We claim:

1. A process for incorporating rubber into a thermoplastic resin which consists essentially of precipitating a rubber latex having a water content of 30 to 90% by weight; removing water mechanically by pressing, filtering or centrifuging the precipitated rubber so that a moist solid rubber having a water content of 10 to 40% by weight is obtained; mixing said moist rubber with a melt of a thermoplastic resin at a temperature of from 140° to 300° C. and removing the remainder of the water by evaporation during or after the incorporation said rubber having a glass temperature of less than 0° C.

2. A process as set forth in claim 1 wherein a copolymer of from 90 to 60% by weight of styrene and from 10 to 40% by weight of acrylonitrile is used as the thermoplastic resin.

3. A process as set forth in claim 1 wherein from 5 to 60% by weight of rubber is worked into 95 to 40% by weight of a thermoplastic resin.

4. A process as set forth in claim 1 wherein said thermoplastic resin is selected from the group consisting of polystyrene, polyvinyl chloride, polymethyl methacrylate and polyformaldehyde.

5. A process as set forth in claim 1 wherein said thermoplastic resin is a copolymer of styrene and a monomer selected from the group consisting of methyl methacrylate, acrylonitrile, butadiene, maleic anhydride, $\alpha$-methylstyrene, nuclear-alkylated styrenes and nuclear-chlorinated styrenes.

6. A process as set forth in claim 1 wherein said thermoplastic resin is a copolymer of vinyl chloride with a monomer selected from the group consisting of vinylidene chloride, propylene and vinyl esters.

7. A process as set forth in claim 1 wherein said thermoplastic resin is a copolymer of methyl methacrylate with an acrylic ester.

8. A process as set forth in claim 1 wherein said rubber is selected from the group consisting of polybutadiene, polyisoprene, natural rubber and polyacrylate esters.

9. A process as set forth in claim 1 wherein said rubber is a copolymer of butadiene with a monomer selected from the group consisting of styrene and acrylonitrile.

10. A process as set forth in claim 1 wherein said rubber is a copolymer of an acrylic ester and a monomer selected from the group consisting of butadiene, styrene, acrylonitrile and vinyl ethers.

11. A process as set forth in claim 1 wherein said rubber is a graft copolymer composed of from 95 to 50% by weight of a butadiene or acrylic ester rubber onto which is polymerized from 5 to 50% by weight of one or more monomers selected from the group consisting of styrene, acrylonitrile, methyl methacrylate and vinyl chloride.

12. A process as set forth in claim 1 wherein said rubber latex is precipitated by adding an electrolyte solution.

References Cited
UNITED STATES PATENTS

| | | | |
|---|---|---|---|
| 3,111,501 | 11/1963 | Thompson | 260—876 R |
| 3,449,471 | 6/1969 | Weitzel et al. | 260—876 R |
| 3,475,516 | 10/1969 | Bower et al. | 260—876 R |

MURRAY TILLMAN, Primary Examiner

J. ZIEGLER, Assistant Examiner

U.S. Cl. X.R.

260—876 R, 878 R, 879, 880 R, 881, 884, 885, 886